United States Patent Office 3,113,857
Patented Dec. 10, 1963

3,113,857
PHENYLSULFAMOYL DODECYLTHIOCARBAMATE AS A NOVEL HERBICIDE
Edward H. Sheers, Flushing, N.Y., assignor to American Cyanamid Company, New York, N.Y., a corporation of Maine
No Drawing. Filed Dec. 20, 1961, Ser. No. 160,948
3 Claims. (Cl. 71—2.6)

The present invention relates to a novel sulfamoyl carbamate derivative, to its preperation and to herbicidal compositions containing the same. More particularly, it relates to a novel herbicidal compound which may be characterized by the formula:

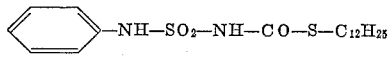

Heretofore, it has been suggested that certain carbamate derivatives exhibit biocidal activity. Although such compounds may be effective in inhibiting or retarding the growth of plants, insects or obnoxious seed, none has been found to possess practical herbicidal properties when employed in dilutions of less than 0.1%. To the present, there remains a demand for a compound which exhibits herbicidal properties at these dilutions.

According to the present invention, an effective herbicide has been found. At dilutions of 0.1% or less, this herbicide: phenylsulfamoyl dodecylthiocarbamate, unexpectedly exhibits practical herbicidal properties of the aforementioned type. The compound is substantially insoluble in water, but soluble in most organic solvents. Advantageously, it may be suspended or dispersed in water and applied directly to either soils or undesirable plants. Alternatively, the suspension may be modified by the addition of surface active or dispersing agents. In general, the compound of the present invention may be formulated by well known methods.

The carbamate compound is prepared by a method involving the stepwise reaction of a halosulfonylisocyanate and either dodecylmercaptan or laurylmercaptan to form N-sulfohalo dodecylthiocarbamate intermediate which is thereafter reacted with aniline. More specifically, one mol of chlorosulfonylisocyanate is vigorously admixed with a cooled benzene solution containing one mol of commercial grade dodecylmercaptan in a suitable reaction vessel. Two mols of aniline are then slowly added to the cooled reaction mixture and stirred for about one-half hour. The contents are thereafter filtered and recovered solids are washed with water and vacuum-dried. Approximately 90% yield of phenylsulfamoyl dodecylthiocarbamate is obtained as white crystals having a melting point of 84° C. to 86° C. The compound analyzes as follows.

Calculated for $C_{19}H_{32}O_3N_2S_2$: C, 56.98%; H, 8.05%; N, 7.00%. Found: C, 57.10%; H, 8.01%; N, 6.91%.

To illustrate the herbicidal activity of the carbamate compound of the present invention, the following example is presented:

A total of four 50/50 acetone and water test solutions, two of which containing 0.1% and the other two containing 0.01% of the above-characterized carbamate, the percentages being by weight, are respectively sprayed on tomato and cucumber plants until "run off" appears. The plants are held in a 100% humidity chamber at 65° F. for thirty-six hours after spraying. They are then removed from the chamber and kept at room temperature for at least four days with proper watering. At the termination of this period, the percent kill of each of the plants is observed and found to be 100%.

Similar results are obtained when the above tests are repeated by applying to the test plants an aqueous emulsion prepared by the addition of the active compound to water containing 0.1% of the calcium salt of oil-soluble polyethyleneglycol ether.

Advantageously, the herbicidal compound of the present invention may be utilized in dilute concentrations by incorporating the latter compound in a variety of inert carriers or diluents. For instance, the compound may be dissolved in an inert organic solvent such as acetone, ethyl acetate, ethyl alcohol, benzene, kerosene, naphtha and equivalents thereof. Alternatively, the compound may be admixed with an inert solid carrier, as for example, fuller's earth, bentonite and equivalents thereof. Moreover, when a suspension of the active compound is prepared by employing a non-solvent, it may be particularly advantageous to add thereto a dispersing or surface active agent of the anionic or non-ionic types. The latter include the fatty acid esters of polyhydric alcohols available as "Span"; the sodium salt of a polymerized propyl naphthalene sulfonic acid formed by condensing formaldehyde with propyl naphthalene sodium sulfonate, available as "Daxad 11"; the ethylene oxide condensates of octyl or higher alkyl phenols commercially available as "Triton X-100"; calcium salts of oil-soluble polyethyleneglycol ethers, and equivaents thereof.

The quantity of inert solid or liquid carrier or diluent employed with respect to the herbicidal compound is not critical. Amounts up to 10% by weight of the carbamate compound based on the weight of the inert carrier are sufficient, and in most cases not more than 5% of the active ingredient can be effectively used.

Although the compound of the present invention has been described as possessing herbicidal activity, it can also be employed in dilute concentrations as a nematocide or fungicide.

I claim:
1. Phenylsulfamoyl dodecylthiocarbamate.
2. A herbicidal composition consisting essentially of an inert carrier and a small but herbicidally effective amount of phenylsulfamoyl dodecylthiocarbamate.
3. A herbicidal composition of claim 2, wherein the carbamate compound is suspended in water.

No references cited.